United States Patent Office

Re. 27,524
Reissued Nov. 28, 1972

27,524

ENZYMATIC DETERMINATION OF NITROGEN-CONTAINING COMPOUNDS AND ENZYMES REACTIVE THEREWITH

Richard G. Nadeau, Claymont, Del., assignor to E. I. du Pont de Nemours and Company, Wilmington, Del.

No Drawing. Original No. 3,485,723, dated Dec. 23, 1969, Ser. No. 502,596, Oct. 22, 1965. Application for reissue Jan. 4, 1971, Ser. No. 103,931
Int. Cl. C12d *13/00*
U.S. Cl. 195—103.5 20 Claims

Matter enclosed in heavy brackets [ ] appears in the original patent but forms no part of this reissue specification; matter printed in italics indicates the additions made by reissue.

ABSTRACT OF THE DISCLOSURE

A process for measuring the amount of a nitrogen-containing compound in a sample or the amount of an enzyme in a sample, the enzyme being reactive with a nitrogen-containing compound, which involves (1) mixing the sample with a compound that is enzymatically reactive with ammonia; (2) adding to the nitrogen-containing compound in the sample an amount of the enzyme or adding to the enzyme a non-rate limiting amount of a nitrogen-containing compound to release ammonia, in either case, at a measurable rate; and (3) measuring the rate of reaction of ammonia with the compound that is reactive with ammonia, this rate of reaction being proportional to the concentration of the nitrogen-containing compound or the concentration of the enzyme, as the case may be, in the original sample.

This invention relates to a procedure for the quantitative determination of nitrogen in nitrogen-containing compounds and, more particularly, to a combination of enzymatic reactions for such determination.

While the invention will be described specifically for the determination of the amount of urea in blood samples, urine samples, etc., the invention is not so limited. The invention is applicable wherever ammonia can be produced from a parent nitrogen-containing compound by an enzymatic reaction at a rate or in an amount related to the amount or concentration of the parent compound.

Urea, the diamide of carbonic acid, is the most important product of protein metabolism in humans and other mammals and in various other animal species. There are many methods for identifying and determining urea. One such method involves hydrolyzing urea with the enzyme urease to produce carbon dioxide and ammonia and then determining either the carbon dioxide gasometrically or the ammonia colorimetrically with Nessler's reagent. The ammonia determination is probably more rapid and, by using appropriate standards, is quite accurate. However, the colorimetric determination of ammonia with Nessler's reagent requires the prior deproteinization of the assay medium. Deproteinization is time consuming and is not always reliable.

It is an object of the present invention to provide a procedure for determining ammonia employing the urease reaction without prior deproteinization. It is a further object to provide a procedure for nitrogen determination that is specific, simple, rapid and sensitive. Other objects will appear hereinafter.

The objects are accomplished by a process that, in its broadest terms, couples an ammonia producing enzyme reaction directly and simultaneously with a second reaction which enzymatically incorporates ammonia as fast as the first reaction produces the ammonia. The basic requirement for the first reaction is that this reaction produce ammonia at a rate or in an amount that is proportional to the parent compound to be determined, e.g., urea, 1-lysine, glycine, etc. The requirements for the second reaction are: (1) it must be compatible with the first reaction; (2) it must be specific for the ammonia released by the first reaction; (3) the rate of the second reaction must be limited only by the rate of ammonia formation from the first reaction; and (4) the rate of the second reaction must be susceptible to being read by suitable means, e.g., spectrophotometric procedures, colorimetric procedures, fluorometric procedures, turbidimetric procedures, conductometric procedures, amperometric procedures, etc.

Specifically, a process for determining urea comprises the steps, in sequence, of adding a measured amount of the urea-containing sample to a solution containing the reduced form of β-nicotinamide-adenine dinucleotide, sodium-α-ketoglutarate and 1-glutamic dehydrogenase, the solution being buffered to a pH of about 6.8 to about 9.0, preferably from 7.8 to 7.9; and, thereafter, adding an aqueous solution of urease and measuring the rate of formation of oxidized β-nicotinamide-adenine dinucleotide.

Since the reduced form of β-nicotinamide-adenine dinucleotide absorbs light very strongly at 340 millimicrons while the oxidized form does not, the rate of disappearance of the reduced form is directly proportional to the decrease in absorbance of light at 340 millimicrons at constant temperature, usually at a constant temperature between 15° C. and 50° C., and can be measured readily by those skilled in the art using a conventional spectrophotometric procedure. Since the rate of oxidation of the reduced form of β-nicotinamide-adenine dinucleotide is also proportional to the rate of formation of ammonia and the rate of formation of ammonia is a function of the concentration of the parent nitrogen-containing compound, the decrease in absorbance of 340 millimicrons can be used as a direct measure of the original concentration of the parent nitrogen-containing compound. It should also be understood that other wavelengths, e.g., 366 millimicrons, can be used for the foregoing purpose.

Although sodium α-ketoglutarate has been designated for use in the preferred process of the invention, it should be understood that other salts of the α-ketoglutaric acid or the acid may be used. The only limitation is that such salt or any acid present must be dissolved in, and compatible with, the reaction system. Thus, by specifying α-ketoglutarate, it is meant that such salts as the sodium, potassium, etc. salt of α-ketoglutaric acid are used.

As set forth previously, this same procedure can be used for the quantitative determination of nitrogen in other parent compounds that yield ammonia, besides urea. In the following table, Table I, are provided parent nitrogen-containing compounds that can be determined by the procedure of this invention and the enzymes to be used in the ammonia-releasing reaction of the procedure. After determining the optimum conditions of temperature, pH, ionic strength, etc. for securing a pseudo zero order kinetic condition, i.e., a linear portion in the curve obtained by plotting the rate of change in absorbance versus nitrogen concentration, the procedures for all the determinations become identical and will be more readily understood by reference to the example presented hereinafter.

TABLE I

| Parent compound | Enzyme |
|---|---|
| l-Lysine | 1-Lysine amino acid oxidase. |
| l-Histidine | Histidine-a-deaminase. |
| l-Serine | 1-Serine dehydrase. |
| l-Threonine | 1-Threonine amino acid oxidase. |
| l-Homoserine | 1-Homoserine amino acid oxidase. |
| l-Cysteine | 1-Cysteine amino acid oxidase. |
| Glycine | Glycine oxidase. |
| l-Aspartic acid | 1-Aspartase. |
| Quanine | Quanine deaminase. |
| Aliphatic amines | Monoamine oxidase. |
| d-Amino acids | d-Amino acid oxidase. |
| l-Glutamine | 1-Glutaminase. |
| Uric acid | Uricase. |

It is apparent that the basic ideas involved in the procedures of this invention can also be used to determine the amount of enzyme present. For such a procedure, the parent nitrogen-containing compounds (urea, l-lysine, etc.) would be added in the non-rate limiting concentration rather than the enzyme (urease, l-lysine amino acid oxidase, etc.). The measurement of the rate of oxidation of the reduced form of β-nicotinamide-adenine dinucleotide would then be a function of the original enzyme concentration.

It will be observed that in the so-called second reaction, the ammonia-incorporating reaction, the ammonia reacts with sodium-α-ketoglutarate to form l-glutamate while the reduced form of the nicotinamide-adenine dinucleotide is oxidized. Alternatively, the ammonia can be incorporated into pyruvic acid by using the enzyme l-alaninedehydrogenase (isolated from Bacillus subtilis). This reaction in which ammonia is incorporated into pyruvic acid also requires the use of the reduced form of β-nicotinamide-adenine dinucleotide which is oxidized during the reaction. The oxidation of the β-nicotinamide-adenine dinucleotide can then be determined in the spectrophotometric manner previously described, by the change in absorbance at 340 millimicrons, to provide a quantitative determination of the nitrogen-containing parent compound. Still another alternative reaction for the detection of ammonia is the reductive incorporation of ammonia into glyoxylate by the enzyme glyoxylate reductase which can be obtained from Microbacterium tuberculosis, Hominis. The rate of this reaction can also be readily determined by the decrease in absorbance at 340 millimicrons, since this enzyme also requires reduced β-nicotinamide-adenine dinucleotide as the coenzyme.

The procedure described which involves a coupled reaction system and which can be used for determining amounts of parent nitrogen compounds as well as for the specific assay of enzymes has many advantages. It is a procedure that is specific; the enzymes have the ability to react specifically with the individual components of complex mixtures. Since the procedure is extremely specific, the necessity for the time-consuming separation of components is minimized. Furthermore, the procedure does not require the complete conversion of the components to be assayed. Thus, the complex conversion of the specific components assayed can be accomplished in a very short time. It will be also noted that the conditions employed in the reactions are sufficiently mild to allow the detection and determination of labile substances. Finally, the procedure is extremely sensitive; it will operate where concentrations of the parent nitrogen-containing compound or the enzyme, whichever is to be determined, are extremely low, e.g., as low as 0.2 microgram per milliliter of assay solution. Other advantages will be apparent from the following example.

EXAMPLE

This is an example for determining the urea nitrogen concentration in samples of blood serum or blood plasma. If urine or other ammonia containing materials are used, the sample should be passed through an ion exchange column, or other suitable means should be used, prior to analysis in order to remove free ammonia.

The procedure depends upon the following two reactions:

$$(1)\ \text{Urea+water} \xrightarrow{\text{Urease}} \text{ammonia+carbon dioxide}$$

$$(2)\ \text{Ammonia+}\alpha\text{-ketoglutrate+the reduce form of }\beta\text{-nicotinamide-adenine dinucleotide} \xrightarrow[\text{Zinc ion}]{\text{Glutamic dehydrogenase}} \text{oxidized }\beta\text{-nicotinamide-adenine dinucleotide+l-glutamate+water.}$$

The first series of runs serves to provide a relationship between the rate of the reaction occurring in Equation 2 and known amounts of urea nitrogen in standard solutions. For these runs, 4.96 milliliters of a reagent solution for carrying out the second reaction are pipetted into a one-centimeter optical cell; the cell is placed in a water bath at 37° C. for 3 minutes; and 0.020 milliliter of the solution to be evaluated is added.

The reagent solution has been prepared by dissolving 34.2 milligrams of l-cysteine hydrochloride in 25 milliliters of a phosphate buffer. The buffer is prepared by mixing 84 milliliters of 1.0 molar sodium dibasicphosphate and 16 milliliters of 1.0 molar potassium monobasicphosphate, diluting the resulting mixture to 1 liter with distilled water, and then adjusting the pH to 7.85. 2.4 milliliters of a solution of 0.1 gram of the disodium salt of β-nicotinamide-adenine dinucleotide in 10 milliliters of the phosphate buffer; 2.4 milliliters of a solution of sodium-α-ketoglutarate prepared by dissolving 0.885 gram of the monosodium salt of α-ketoglutaric acid in 2 milliliters of water and adjusting the pH to 7.8 with 1.0 normal sodium hydroxide and adding sufficient phosphate buffer to bring the volume to 25 milliliters; and 5 milliliters of ammonia-free l-glutamic dehydrogenase suspended in a solution of 50% glycerol and 0.1 molar phosphate buffer at a pH of 7.0, the suspension containing 30 units of the enzyme per milliliter, are all added to the l-cysteine hydrochloride solution; and the solution is diluted with the phosphate buffer to a total volume of 100 milliliters.

0.02 milliliter of various standard solutions containing known amounts of urea nitrogen are then added to provide the reference curve. These amounts range from 200 milligrams of nitrogen per 100 milliliters of phosphate buffer (200 mg. percent), prepared using 2.148 grams of urea in 500 milliliters of phosphate buffer, down to 10 milligrams of nitrogen per 100 milliliters of phosphate buffer (10 mg. percent), prepared by diluting 5 milliliters of the first prepared urea solution with 95 milliliters of the buffer.

After a two-minute delay following the addition of the test solution, 0.02 milliliter of a solution of 10 milligrams of urease (2500 units/gram) in 1 milliliter of a 50% glycerol-distilled water solution is added to the optical cell. While maintaining the temperature of the optical cell at 37° C., absorbance versus time at a wavelength of 340 millimicrons is read using a spectrophotometer. From the linear portion (usually from 30 seconds to 2 minutes after the urease addition) the reaction rate (Δ absorbance/minute) is obtained for each known urea nitrogen concentration and the results are plotted as the standard reference curve.

After preparing the standard reference curve, the foregoing procedure is repeated but substituting a 0.02 milliliter sample of the blood serum or blood plasma, etc. for the standard solutions of urea nitrogen. The absorbance at a wavelength of 340 millicrons is read and recorded as a function of time. From the reaction rate obtained in the linear portion of this curve (usually from 30 seconds to 2 minutes after the urease addition), the urea nitrogen is read off the standard reference curve.

What is claimed is:

1. A process for the quantative determination of a nitrogen-containing compound capable of releasing ammonia upon enzymatic action which comprises adding a measured amount of a sample of such nitrogen-containing compound to a solution of non-rate limiting amounts of a first enzyme and compound A, said compound A being reactive with ammonia in a reproducible measurable manner in the presence of said first enzyme; thereafter, adding a second enzyme that reacts with said nitrogen-containing compound to release ammonia, the amount of said second enzyme added being sufficient to release ammonia from said sample at a measurable rate proportional to the concentration of the nitrogen-containing compound in said sample; and measuring the rate of reaction of ammonia with said compound A while maintaining the system at a substantially constant temperature and at a substantially constant pH.

2. A process for the quantitative determination of a nitrogen-containing compound capable of releasing ammonia upon enzymatic action which comprises adding a measured amount of a sample of such nitrogen-containing compound to a solution of non-rate limiting amounts of l-glutamic dehydrogenase, α-ketoglutarate, and the reduced form of β-nicotinamide-adenine dinucleotide; thereafter, adding a second enzyme that reacts with said nitrogen-containing compound to release ammonia, the amount of said second enzyme added being sufficient to release ammonia from said sample at a measurable rate proportional to the concentration of the nitrogen-containing compound in said sample; and measuring the rate of disappearance of the reduced form of β-nicotinamide-adenine dinucleotide while maintaining the system at a substantially constant temperature and at a substantially constant pH.

3. A process as in claim 2 wherein said nitrogen-containing compound is selected from the group consisting of urea, uric acid, l-lysine, l-histidine, l-serine, l-threonine, l-homoserine, l-cysteine, glycine, l-aspartic acid, quanine, aliphatic amines, d-amino acids and l-glutamine, and said enzyme is, correspondingly, selected from the group consisting of urease, uricase, l-lysine amino acid oxidase, histidine - a - deaminase, l-serine dehydrase, l-threonine amino acid oxidase, l-homoserine amino acid oxidase, l-cysteine amino acid oxidase, glycine oxidase, l-aspartase, quanine deaminase, monoamine oxidase, d-amino acid oxidase and l-glutaminase.

4. A process for the quantitative determination of a nitrogen-containing compound capable of releasing ammonia upon enzymatic action which comprises adding a measured amount of a sample of such nitrogen-containing compound to a solution of non-rate limiting amounts of l-alanine dehydrogenase, pyruvate, and the reduced form of β-nicotinamide-adenine dinucleotide; thereafter, adding a second enzyme that reacts with said nitrogen-containing compound to release ammonia, the amount of said second enzyme added being sufficient to release ammonia from said sample at a measurable rate proportional to the concentration of the nitrogen-containing compound in said sample; and measuring the rate of disappearance of the reduced form of β-nicotinamide-adenine dinucleotide while maintaining the system at a substantially constant temperature and at a substantially constant pH.

5. A process for the quantitative determination of a nitrogen-containing compound capable of releasing ammonia upon enzymatic action which comprises adding a measured amount of a sample of such nitrogen-containing compound to a solution of non-rate limiting amounts of glyoxylate reductase, glyoxylate, and the reduced form of β-nicotinamide-adenine dinucleotide; thereafter, adding a second enzyme that reacts with said nitrogen-containing compound to release ammonia, the amount of said second enzyme added being sufficient to release ammonia from said sample at a measurable rate proportional to the concentration of the nitrogen-containing compound in said sample; and measuring the rate of disappearance of the reduced form of β-nicotinamide-adenine dinucleotide while maintaining the system at a substantially constant temperature and at a substantially constant pH.

6. A process for the quantitative determination of urea which comprises adding a measured amount of a urea-containing sample to a solution of non-rate limiting amounts of l-glutamic dehydrogenase, α-ketoglutarate and the reduced form of β-nicotinamide-adenine dinucleotide, said solution being buffered to a pH of 6.8–9; thereafter, adding an amount of a solution of urease sufficient to release ammonia from said urea-containing sample at a measurable rate proportional to the concentration of urea in said sample; and measuring the rate of disappearance of the reduced form of β-nicotinamide-adenine dinucleotide while maintaining the system at a substantially constant temperature selected from between 15° C. and 50° C.

7. A process for the quantitative determination of urea which comprises adding a measured amount of a urea-containing sample to a solution of non-rate limiting amounts of l-glutamic dehydrogenase, the reduced form of β-nicotinamide-adenine dinucleotide, and sodium-α-ketoglutarate, said solution being buffered to a pH of 7.8–7.9; thereafter, adding an amount of an aqueous glycerol solution of urease sufficient to release ammonia from said urea-containing sample at a measurable rate proportional to the concentration of urea in said sample; and measuring the rate of disappearance of the reduced form of β-nicotinamide-adenine dinucleotide while maintaining the system at a substantially constant temperature of 37° C.

8. A process for the quantitative determination of an enzyme selected from the group consisting of urease, uricase, l-lysine amino acid oxidase, histidine-a-deaminase, l-serine dehydrase, l-threonine amino acid oxidase, l-homoserine amino acid oxidase, l-cysteine amino acid oxidase, glycine oxidase, l-aspartase, quanine deaminase, monoamine oxidase, d-amino acid oxidase and l-glutaminase which comprises adding a measured amount of a sample containing said enzyme to a solution of l-glutamic dehydrogenase, α-glutarate, the reduced form of β-nicotinamide-adenine dinucleotide and an excess of a nitrogen-containing compound selected, correspondingly, from the group consisting of urea, uric acid, l-lysine, l-histidine, l-serine, l-threonine, l-homoserine, l-cysteine, glycine, l-aspartic acid, quanine, aliphatic amines, d-amino acids and l-glutamine; and measuring the rate of disappearance of the reduced form of β-nicotinamide-adenine dinucleotide while maintaining the system at a constant temperature.

9. A process for the quantitative determination of urease which comprises adding a measured amount of a urease-containing sample to a solution of l-glutamic dehydrogenase, the reduced form of β-nicotinamide-adenine dinucleotide, sodium-α-ketoglutarate, and an excess of urea, said solution being buffered to a pH of 7.8–7.9; and measuring the rate of disappearance of the reduced form of β-nicotinamide-adenine dinucleotide while maintaining the system at a constant temperature.

10. A process for the quantitative determination of a first enzyme which is reactive with a nitrogen-containing compound, said compound being capable of releasing ammonia upon reaction therewith, which comprises adding a measured amount of a sample containing such first enzyme to a solution containing a non-rate limiting amount of compound A and a second enzyme, said compound A being reactive with ammonia in a reproducible measurable manner in the presence of said second enzyme; thereafter, adding a non-rate limiting amount of a nitrogen-containing compound which is reactive with said first enzyme to release ammonia from said sample at a measurable rate proportional to the concentration of said first enzyme in said sample; and measuring the rate of reaction of ammonia with said compound A while maintaining the system at a substantially constant temperature and at a substantially constant pH.

11. A process for the quantitative determination of a nitrogen-containing compound capable of releasing ammonia upon enzymatic action which comprises adding a measured amount of a sample of such nitrogen-containing compound to a solution having excess amounts of a first enzyme and compound A, said compound A being reactive with ammonia in a reproducible measurable manner in the presence of said first enzyme; thereafter, adding a second enzyme that reacts with said nitrogen-containing compound to release ammonia, the amount of said second enzyme added being sufficient to release ammonia from said sample in an amount that is proportional to the concentration of the nitrogen-containing compound in said sample; and measuring the amount of ammonia that reacts with said compound A.

*12. A process for the quantitative determination of a nitrogen-containing compound capable of releasing ammonia upon enzymatic action which comprises adding a measured amount of a sample of such nitrogen-containing compound to a solution of non-rate limiting amounts of a first enzyme and compound A, said compound A being reactive with ammonia in a reproducible measurable manner in the presence of said first enzyme; adding a second enzyme that reacts with said nitrogen-containing compound to release ammonia, the amount of said second enzyme added being sufficient to release ammonia from said sample at a measurable rate proportional to the concentration of the nitrogen-containing compound in said sample; and measuring the rate of reaction of ammonia with said compound A while maintaining the system at a substantially constant temperature and at a substantially constant pH.*

*13. A process for the quantitative determination of a nitrogen-containing compound capable of releasing ammonia upon enzymatic action which comprises adding a measured amount of a sample of such nitrogen-containing compound to a solution of non-rate limiting amounts of l-glutamic dehydrogenase, α-ketoglutarate, and the reduced form of β-nicotinamide-adenine dinucleotide; adding a second enzyme that reacts with said nitrogen-contatining compound to release ammonia, the amount of said second enzyme added being sufficient to release ammonia from said sample at a measurable rate proportional to the concentration of the nitrogen-containing compound in said sample; and measuring the rate of disappearance of the reduced form of β-nicotinamide-adenine dinucleotide while maintaining the system at a substantially constant temperature and at a substantially constant pH.*

*14. A process as in claim 13 wherein said nitrogen-containing compound is selected from the group consisting of urea, uric acid, l-lysine, l-histidine, l-serine, l-threonine, l-homoserine, l-cysteine, glycine, l-aspartic acid, quanine, aliphatic amines, d-amino acids and l-glutamine, and said enzyme is, correspondingly, selected from the group consisting of urease, uricase, l-lysine amino acid oxidase, histidine-a-deaminase, l-serine dehydrase, l-threonine amino acid oxidase, l-homoserine amino acid oxidase, l-cysteine amino acid oxidase, glycine oxidase, l-aspartase, quanine deaminase, monoamine oxidase, d-amino acid oxidase and l-glutaminase.*

*15. A process for the quantitative determination of a nitrogen-containing compound capable of releasing ammonia upon enzymatic action which comprises adding a measured amount of a sample of such nitrogen-containing compound to a solution of non-rate limiting amounts of l-alanine dehydrogenase, pyruvate, and the reduced form of β-nicotinamide-adenine dinucleotide; adding a second enzyme that reacts with said nitrogen-containing compound to release ammonia, the amount of said second enzyme added being sufficient to release ammonia from said sample at a measurable rate proportional to the concentration of the nitrogen-containing compound in said sample; and measuring the rate of disappearance of the reduced form of β-nicotinamide adenine dinucleotide while maintaining the system at a substantially constant temperature and at a substantially constant pH.*

*16. A process for the quantitative determination of a nitrogen-containing compound capable of releasing ammonia upon enzymatic action which comprises adding a measured amount of a sample of such nitrogen-containing compound to a solution of non-rate limiting amounts of glyoxylate reductase, glyoxylate, and the reduced form of β-nicotinamide-adenine dinucleotide; adding a second enzyme that reacts with said nitrogen-containing compound to release ammonia, the amount of said second enzyme added being sufficient to release ammonia from said sample at a measurable rate proportional to the concentration of the nitrogen-containing compound in said sample; and measuring the rate of disappearance of the reduced form of β-nicoatinamide-adenine dinucleotide while maintaining the system at a substantially constant temperature and at a substantially constant pH.*

*17. A process for the quantitative determination of urea which comprises adding a measured amount of a urea-containing sample to a solution of non-rate limiting amounts of l-glutamic dehydrogenase, α-ketoglutarate and the reduced form of β-nicotinamide-adenine dinucleotide, said solution being buffered to a pH of 6.8–9; adding an amount of a solution of urease sufficient to release ammonia from said urea-containing sample at a measurable rate proportional to the concentration of urea in said sample; and measuring the rate of disappearance of the reduced form of β-nicotinamide-adenine dinucleotide while maintaining the system at a substantially constant temperature selected from between 15° C. and 50° C.*

*18. A process for the quantitative determination of urea which comprises adding a measured amount of a urea-containing sample to a solution of non-rate limiting amounts of l-glutamic dehydrogenase, the reduced form of β-nicotinamide-adenine dinucleotide, and sodium-α-ketoglutarate, said solution being buffered to a pH of 7.8–7.9; adding an amount of an aqueous glycerol solution of urease sufficient to release ammonia from said urea-contatining sample at a measurable rate proportional to the concentration of urea in said sample; and measuring the rate of disappearance of the reduced form of β-nicotinamide-adenine dinucleotide while maintaining the system at a substantially constant temperature of 37° C.*

*19. A process for the quantitative determination of a first enzyme which is reactive with a nitrogen-containing compound, said compound being capable of releasing ammonia upon reaction therewith, which comprises adding a measured amount of a sample containing such first enzyme to a solution containing a non-rate limiting amount of compound A and a second enzyme, said compound A being reactive with ammonia in a reproducible measurable manner in the presence of said second enzyme; adding a non-rate limiting amount of a nitrogen-containing compound which is reactive with said first enzyme to release ammonia from said sample at a measurable rate proportional to the concentration of said first enzyme in said sample; and measuring the rate of reaction of ammonia with said compound A while maintain-*

*ing the system at a substantially constant temperature and at a substantially constant pH.*

*20. A process for the quantitative determination of a nitrogen-contatining compound capable of releasing ammonia upon enzymatic action which comprises adding a measured amount of a sample of such nitrogen-containing compound to a solution having excess amounts of a first enzyme and compound A, said compound A being reactive with ammonia in a reproducible measurable manner in the presence of said first enzyme; adding a second enzyme that reacts with said nitrogen-containing compound to release ammonia, the amount of said second enzyme added being sufficient to release ammonia from said sample in an amount that is proportional to the concentration of the nitrogen-containing compound in said sample; and measuring the amount of ammonia that reacts with said compound A.*

References Cited

The following references, cited by the Examiner, are of record in the patented file of this patent or the original patent.

UNITED STATES PATENTS

| | | | |
|---|---|---|---|
| 2,999,052 | 9/1961 | Albaum et al. | 195—103.5 |
| 3,249,513 | 5/1966 | Babson | 195—103.5 |

OTHER REFERENCES

Dixon et al.: Enzymes, Academic Press Inc., New York, p. 597 (1958).

Colowich et al.: Methods in Enzymology, vol. V, pp. 673–676 (1962).

ALVIN E. TANENHOLTZ, Primary Examiner

U.S. Cl. X.R.

195—29